United States Patent [19]
Shannon et al.

[11] Patent Number: 5,384,875
[45] Date of Patent: Jan. 24, 1995

[54] FIBER OPTIC COUPLER PACKAGE AND PACKAGING METHOD

[75] Inventors: John H. Shannon, Scottsdale; Karl A. Fetting, Glendale; Robert E. Coté, Phoenix, all of Ariz.

[73] Assignee: Honeywell Inc., Minneapolis, Minn.

[21] Appl. No.: 125,894

[22] Filed: Sep. 23, 1993

[51] Int. Cl.⁶ .............................................. G02B 6/26
[52] U.S. Cl. .......................................... 385/51; 385/43
[58] Field of Search .................. 385/39, 43, 50, 51, 385/134, 136, 137

[56] References Cited

U.S. PATENT DOCUMENTS

| | | | |
|---|---|---|---|
| 4,593,968 | 6/1986 | Giallorenzi | 385/51 |
| 4,906,068 | 3/1990 | Olson et al. | 385/43 |
| 4,923,268 | 5/1990 | Xu | 385/50 |
| 5,148,508 | 9/1992 | Anjan et al. | 385/51 |
| 5,261,018 | 11/1993 | Suganuma et al. | 385/51 |
| 5,263,104 | 11/1993 | Anjan et al. | 385/51 |
| 5,293,440 | 3/1994 | Miles et al. | 385/51 |

FOREIGN PATENT DOCUMENTS

| | | | |
|---|---|---|---|
| 106116A | 10/1982 | European Pat. Off. | |
| 124927A | 12/1983 | European Pat. Off. | |
| 343588A | 5/1988 | European Pat. Off. | |
| 55-98701 | 7/1980 | Japan | 385/51 |
| 63-316008 | 12/1988 | Japan | 385/51 |

OTHER PUBLICATIONS

Product Literature EPO-TEK ® 354 High Temperature Epoxy, Extended Pot Life of Epoxy Technology Inc. ®, 1 page, no date.
DeSolite ® Single Coat Coating from DSM Desotech, Nov. 1992, 4 pp.

Primary Examiner—John D. Lee
Attorney, Agent, or Firm—B. C. Downs; R. E. Champion; A. Medved

[57] ABSTRACT

A fiber optic coupler includes at least two optical fibers having a coupled region and at least one lead portion extending therefrom. The optical fibers have a protective jacket thereon. The protective jacket is removed from the coupled region and from a region of the at least one lead portion adjacent the coupled region resulting in a jacketless coupled region, at least one jacketless lead portion and at least one jacketed lead portion. The fiber optic coupler further includes a protective body having a receiving space therein for receiving the coupled region. The protective body has at least one entrance from which said jacketed lead portion emerges. A rejacket material at least partially surrounds a length of the jacketless lead portion adjacent the jacketed lead portion resulting in a rejacketed lead portion. An adhesive material at least partially about a length of the jacketed lead portion at the entrance and at least partially about the rejacketed lead portion secures the length of the jacketed lead portion and rejacketed lead portion to the protective body.

15 Claims, 2 Drawing Sheets

FIBER OPTIC COUPLER PACKAGE AND PACKAGING METHOD

FIELD OF THE INVENTION

The present invention pertains generally to fiber optic couplers. More particularly, the present invention pertains to a package design for a fiber optic coupler.

BACKGROUND OF THE INVENTION

A fiber optic coupler is used in optical fiber interconnection arrangements to couple electromagnetic waves from one of two or more optical fibers to another optical fiber in the group. Alternatively, the coupler may couple one optical fiber to itself to form a loop. Such couplers have been used in optical communications, optical sensors, and fiber optic gyroscopes. A fiber optic coupler is formed by fusing and tapering two or more optical fibers together. The fabrication usually involves aligning principle axes of two or more optical fibers after removing a portion of a protective jacket on the optical fibers. They are then brought together and heated to fuse and taper the optical fibers resulting in a fused and tapered coupled region for coupling of optical power.

Fiber optic couplers are very sensitive to environmental influences because the optical material of which the optical fibers are made is very fragile. In addition, the coupling region is not provided with the jacket so adverse environments influence the quality of the optical material of the fiber optic coupler and/or the signals transmitted through the fiber optic coupler. Therefore, the optical signal processing performance of a fiber optic coupler in various environments typically depends upon the type of housing or package in which it is positioned for protection and on the method used to assemble the packaged fiber optic coupler.

In a fused fiber optic coupler, the fused and tapered portions of the coupler where the transfer of optical power takes place is structurally weak and sensitive to environmental conditions. The extinction ratio and the transmissibility of the coupler can be degraded if the materials used in the package for the fiber optic coupler subject the fiber optic coupler to a non-uniform distribution of stresses, either during the fabrication process, or thereafter during use due to changes in environmental conditions.

Packaging techniques which have been used to protect the fiber optic coupler from deleterious environmental influences include the use of quartz glass tubes as protective covering and as a support for the coupled region of a fiber optic coupler. In such an arrangement, the coupled region is typically placed within a central open portion of a slotted quartz glass tube and epoxy is applied at the ends of the tube to secure the optical fibers extending therefrom and the coupled region to the tube. However, difficulties arise in environments in which substantial shock or vibration occur because of the resulting material movements of the coupled region of the fiber optic coupler suspended in the central open portion of the tube.

In part, the above difficulties have been overcome by placing the fibers within the slotted glass tube and then heating the mid-region of the tube until it collapses about the fiber by stretching the tube to reduce the diameter thereof. This method places the tube in direct contact with the optical fibers and the coupled region of the fiber optic coupler, thereby providing rigid support to the coupled region. However, this places additional stress on the coupled region causing losses and other difficulties.

With a fiber optic coupler secured in a slotted glass tube with epoxy applied at both ends of the tubes to hold the coupler in tension, degradation in processing performance of the fiber optic coupler occurs in deleterious environmental conditions. This degradation occurs because the epoxy holding the fiber optic coupler in tension is partly placed on a jacketed lead portion extending from ends of the slotted tube and, in addition, partly positioned to secure the bare optical fibers between the jacketed portion and the coupled region to the glass tube. Application of the adhesive to the bare optical fibers is necessary because if the adhesive is only placed to secure the jacketed lead portions to the glass tube, the unstripped or jacketed fiber allows slippage underneath the jacket. Such adhesive on the base filters causes degradation in processing performance.

Techniques such as those discussed above for packaging fiber optic couplers leave much to be desired for protecting the coupler. This protection is especially lacking where the fiber optic coupler and the packaging thereof are often subjected to extremely high or extremely low temperatures, to very high temperature variations in relatively short periods of time, and/or to vibrations or impacts of controlled magnitudes. Thus, it has been observed that the failure or breakage rate of fiber optic couplers encased in such manners, presents a severe limitation to the use of such packaged fiber optic couplers in communication applications. Therefore, an improved package and packaging method for fiber optic couplers is desired.

SUMMARY OF THE INVENTION

The present invention provides a fiber optic coupler including at least two optical fibers having a coupled region and at least one lead portion extending therefrom. The optical fibers have a projective jacket thereon. The protective jacket is removed from the coupled region and from a region of the at least one lead portion adjacent to the coupled region resulting in a jacketless coupled region, at least one jacketless lead portion, and at least one jacketed lead portion. The fiber optic coupler further includes a protective body having a receiving space therein for receiving the coupled region and having at least one entrance region from which the at least one jacketed lead portion emerges. A rejacket material surrounds at least partially a length of the at least one jacketless lead portion adjacent the at least one jacketed lead portion resulting in a rejacketed lead portion. An adhesive material at least partially about a length of the at least one jacketed lead portion at the entrance and at least partially about the rejacketed lead portion secures the length of the at least one jacketed lead portion and rejacketed lead portion to the protective body.

In one embodiment of the fiber optic coupler, the rejacket material is a soft buffer material. Such material may be a soft acrylate.

The present invention also includes a method of packaging a fiber optical coupler having at least two optical fibers, including a coupled region and at least one lead portion extending therefrom. The optical fibers have a protective jacket thereon. The protective jacket is removed from the coupled region and from a region of the at least one lead portion adjacent the coupled region resulting in a jacketless coupled region, at least one jacketless lead portion and at least one jacketed lead portion. The method includes the step of providing a protective body having a receiving space therein for receiving the coupled region. The protective body has at least one entrance through which the at least one jacketed lead portion emerges when said coupled region is positioned therein. A rejacket material is applied at least partially about a length of the at least one jacketless lead portion adjacent the jacketed lead portion and the fiber optic coupler is secured within the receiving space of the protective body with an adhesive at least partially about a length of the at least one jacketed lead portion at the entrance and at least partially about the rejacket material.

DETAILED DESCRIPTION OF THE PREFERRED EMBODIMENT

Figure 1:
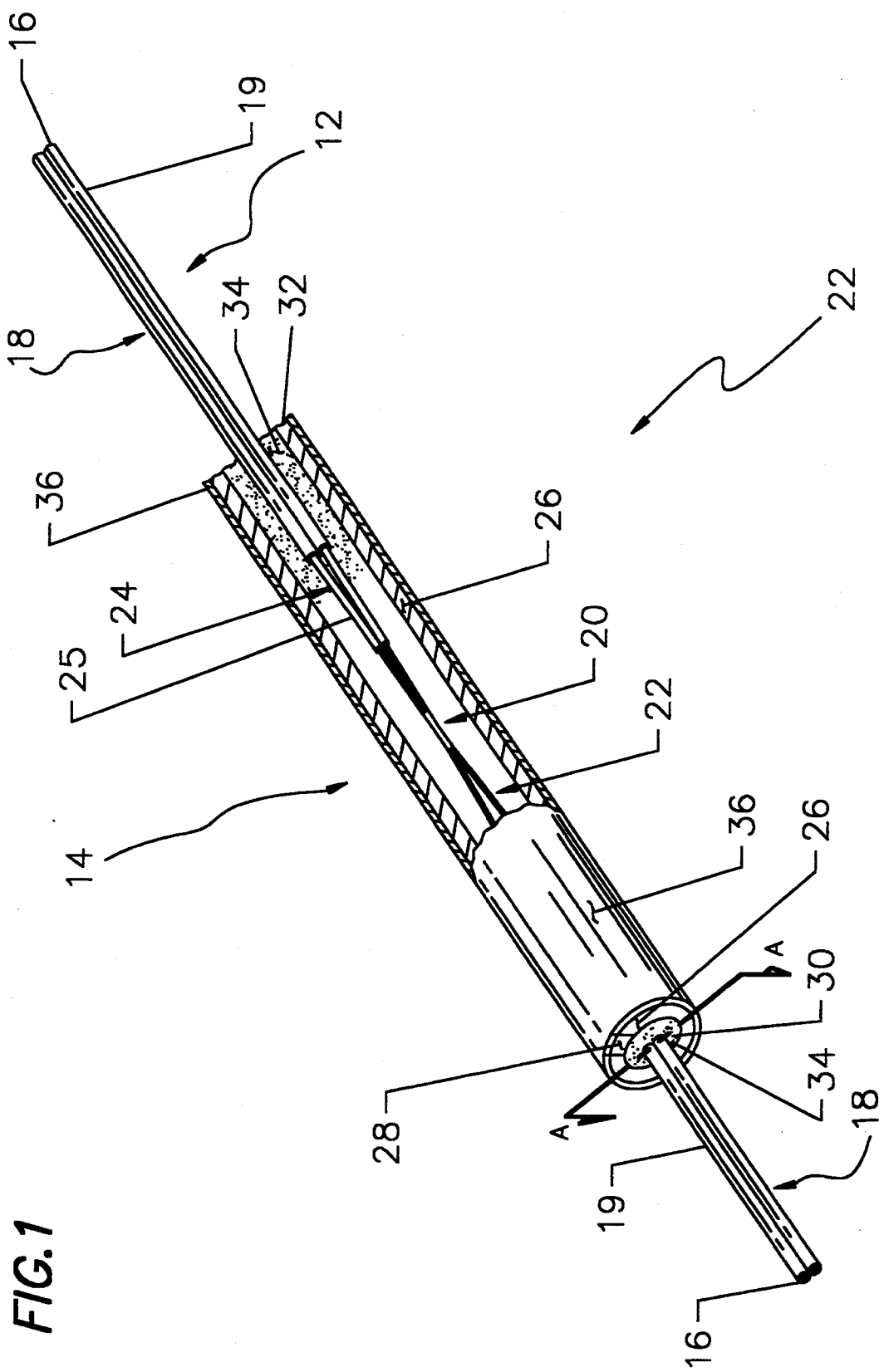
FIG. 1 shows a partially cutaway perspective view of a packaged fiber optic coupler.
Figure 2:
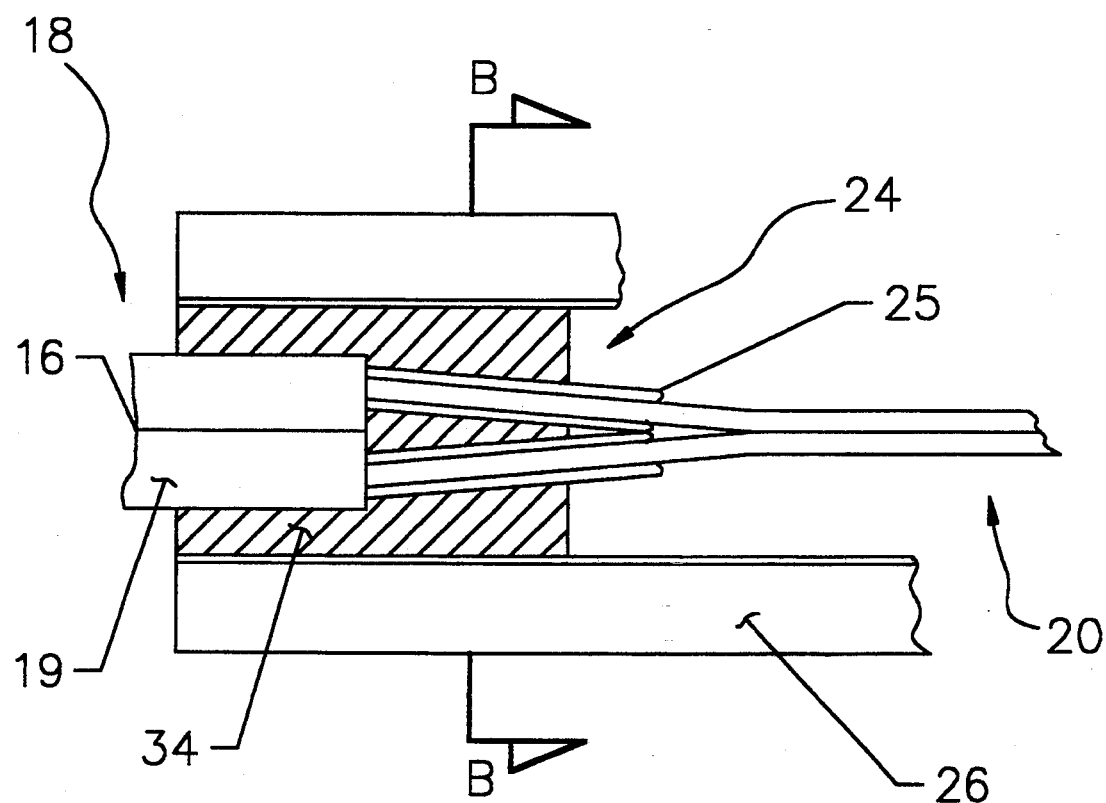
FIG. 2 shows an enlarged partial cross section at line AA of the packaged fiber optic coupler of FIG. 1.
Figure 3:
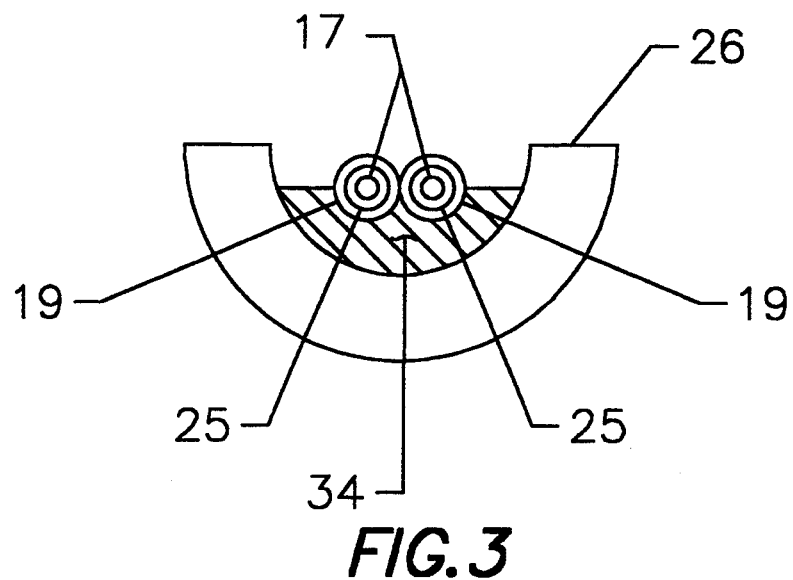
FIG. 3 shows a cross section at line BB of the partial cross section of the packaged fiber optic coupler of FIG. 2.

A packaged fiber optic coupler 10 and method of packaging a fiber optic coupler shall be described with reference to FIGS. 1-3. The packaged fiber optic coupler 10 includes fiber optic coupler 12 and coupler package 14. Fiber optic coupler 12 includes optical fibers 16 having a jacket 19 thereon about fiber portion 17. A portion of the jacket 19 is removed from a section of the optical fibers such that a coupled region 20 can be formed by a fusing and tapering process. Such process may include any one of a number of techniques for creating said coupled region 20 known to those skilled in the art; the coupled region allowing for coupling of optical power.

The fiber optic coupler 12 after removal of the jacket and creation of the coupled region, includes jacketed lead portions 18, coupled region 20, and jacketless lead portions 22. Jacketless lead portions 22 prior to a rejacketing process to be explained in further detail below along with the coupler package 14, extend between the coupled region 20 and jacketed lead portions 18. After the rejacketing process, in which a rejacket material 25 is applied to a length of jacketless lead portions 22, the fiber optic coupler 12 includes jacketed lead portions 18, rejacketed lead portions 24 (only one shown), jacketless lead portions 22 and coupled region 20. The rejacket material 25 is applied to the jacketless lead portions 22 adjacent the jacketed lead portions 18. However, the rejacket lead portion 24 extends only to a predetermined distance from coupled region 20, such that a portion of the jacketless lead portions 22 remain between the coupled region 20 and rejacketed lead portion 24.

In addition to the rejacket material 25, the coupler package 14 includes a quartz glass rod 26 having a first end 30 and a second end 32 which functions as a primary protective body for fiber optic coupler 12. A slot 28 is provided along the entire length of the glass rod 26. It is typically provided by cutting a wall of the glass rod 26 along its direction of elongation with a diamond saw. Slot 28 provides access to an interior receiving space within the rod 26 to allow fiber optic coupler 12 to be positioned therein. Openings at first end 30 and second end 32 of glass rod 26 allow for emergence of jacketed lead portions 18 therethrough. Glass rod 26 may also be a rectangular block having a receiving space therein with the rectangular shaped block having an entrance for access to the receiving space. Any geometrical shape appropriate for providing a primary protective function for the fiber optic coupler 12 is contemplated in accordance with the present invention as defined by the accompanying claims.

The coupler package 14 also includes an outer protective material 36 such as a stainless steel tube or shrink wrap which will provide additional environmental protection for the fiber optic coupler 12 when positioned within glass rod 26. The present invention is not limited to those outer protective materials listed as any number of a protective materials are available and may be utilized to serve such secondary protective functions.

A rigid structural adhesive 34 is positioned at the first end 30 and second end 32 of glass rod 26 to secure and hold the fiber optic coupler in tension. In conventional approaches to holding the fiber optic coupler in tension, the adhesive utilized was placed to secure jacketed lead portions 18 to the protective body or glass rod 26 and also placed to secure the jacketless lead portions 22 to the protective body or glass rod 26. Attachment of the bare jacketless lead portions 22 to the protective body was necessary because an extremely soft silicon gel primary buffer in the unstripped fibers of the jacketed lead portions allowed slippage underneath the jacket making it impossible to insure proper fiber tension by securing only the jacketed lead portions. However, applying adhesive to the bare glass to insure proper tension created other disadvantages, especially in adverse environmental conditions.

In accordance with the present invention, the adhesive 34 is placed at least partially about jacketed lead portions 18 and at least partially about rejacketed lead portions 24. The adhesive 34 is not applied to the bare jacketless lead portions 22. As described above, in the conventional method of holding the fiber optic coupler in proper fiber tension, polarization of the fiber optic coupler degraded dramatically at cold temperatures because of the hard structural adhesive stressing the fibers at such temperatures. By utilizing a rejacket material 25 and adhering the rejacket material to the primary protective body rather than the bare jacketless lead portions, stress on the fiber optic coupler at extreme temperatures is dramatically decreased. Therefore, polarization cross coupling is minimized. The rejacket material 25 is a soft material which adheres to and protects the bare glass of the jacketless optical fibers while allowing the adhesive 34 to securely anchor the fiber optic coupler 12 via the rejacket material avoiding tension loss throughout the operating environment.

The packaged fiber optic coupler 10 is formed by providing the glass rod 26 with the slot 28 created therein; the glass rod 26 also having openings at both the first end 30 and the second end 32 thereof. The glass rod 26 is then thoroughly cleaned in an ultrasonic acetone bath followed by multiple rinsings of methanol and distilled water without drying between rinsings. Thus, contaminants from its surfaces are removed. The glass rod 26 is then blown dry with nitrogen gas. The glass rod 26, now cleaned, is immediately used in forming the packaged fiber optic coupler 10. Such cleaning is readily known to one skilled in the art and variations in the cleaning process are contemplated in accordance with the present invention.

The fiber optic coupler 12 including jacketed lead portions 18, coupled region 20 and jacketless lead portions 22 is then prepared for insertion into the receiving space of glass rod 26. At this point in time, jacketless lead portions 22 extend from coupled region 22 to jacketed lead portions 18. The rejacket material 25 is then applied about a length of the jacketless lead portions 22 adjacent the jacketed lead portions 18. The rejacket material 25 forms a jacket around a length of jacketless lead portions 22. The length rejacketed is less than the total distance between the coupled region 20 and a jacketed lead portion 18. The fiber optic coupler 12 with the formed rejacketed portions 24 is then positioned in the receiving space of glass rod 26 through slot 28 thereof such that the coupled region avoids contact with the glass rod 26.

A rigid structural adhesive 34 is then used to fix the fiber optic coupler 12 to the glass rod 26 by attaching the rejacket material 25 of rejacketed lead portions 24 and the jacketed lead portions 18 residing within glass rod 26 to the glass rod; the jacketed lead portions 18 extending through the openings at the first end 30 and second end 32 of glass rod 26. The rigid structural adhesive 34 via the rejacket material 25 securely anchors the fiber optic coupler 12 to the glass rod 26. The rigid structural adhesive 34 is put into the openings of first end 30 and second end 32 of glass rod 26 between the glass rod 26 and fiber optic coupler 12 until the adhesive fills the openings and covers the jacket 19 of the optical fibers 16. This adhesive is then cured. The fiber optic coupler 12 is then suspended within the receiving space of the glass rod 26 such that the coupled region 20 does not contact the protective body or glass rod 26.

The rejacket material 25 is a soft buffer material such as a soft acrylate. In the preferred embodiment, the soft acrylate is DeSolite® Single Coat Coating. DeSolite® is available from DSM Desotech, Des Plaines, Ill. The rejacket material 25 being a soft material protects the bare glass while allowing the coupler package 14 to securely anchor the fiber optic coupler 12 avoiding tension loss throughout the operating environment. DeSolite® is an ultraviolet light cured coating and adheres to glass allowing for such secure anchoring.

The rigid structural adhesive 34 may be ELC4481, available from Electro-Lite Corporation of Danbury, Conn. ELC4481 is an ultraviolet light curable adhesive. In addition, the rigid structural adhesive may be EPO-TEK® 354T, a high temperature epoxy available from Epoxy Technology, Inc.®, Billerica, Mass. EPO-TEK® 354T is a thermally cured adhesive. Both EPO-TEK® 354T or ELC4481 may either surround rejacket material 25 and jacketed lead portions within the receiving space of glass rod 26 in whole or partially.

After the fiber optic coupler 12 is secured in the glass rod 26, the glass rod 26 is coated with a thin layer of silicon adhesive. The glass rod 26 with the fiber optic coupler 12 secured therein is then inserted into an outer protective material 36. As indicated previously, the outer protective material 36 may be a stainless steel tube with the silicon adhesive bonding the glass rod 26 thereto. Alternatively, and as known to one skilled in the art, a shrink wrap outer protective material may also be utilized as a secondary protector.

Those skilled in the art will recognize that only preferred embodiments of the present invention have been disclosed herein, and other advantages may be found and realized, and various modifications may be suggested by those versed in the art. It should be understood that the embodiment shown herein may be altered and modified without departing from the true spirit and scope of the invention as defined in the accompanying claims.

What is claimed is:

1. A fiber optic coupler, comprising:
   at least two optical fibers having a coupled region and at least one lead portion extending therefrom, said optical fibers having a protective jacket thereon, said protective jacket being removed from said coupled region and from a region of said at least one lead portion adjacent said coupled region resulting in a coupled region, at least one jacketless lead portion, and at least one jacketed lead portion;
   a protective body having a receiving space therein for receiving said coupled region, said protective body having at least one entrance from which said at least one jacketed lead portion emerges;
   a rejacket material surrounding at least partially a length of said at least one jacketless lead portion adjacent said at least one jacketed lead portion resulting in a rejacketed lead portion; and
   an adhesive material at least partially about a length of said at least one jacketed lead portion at said entrance and at least partially about said rejacketed lead portion to secure said length of said at least one jacketed lead portion and rejacketed lead portion to said protective body.

2. A coupler according to claim 1, wherein said rejacket material is a soft buffer material.

3. A coupler according to claim 2, wherein said rejacket material is a soft acrylate.

4. A coupler according to claim 2, wherein said adhesive material is a thermally cured rigid structural adhesive.

5. A coupler according to claim 2, wherein said adhesive material is an ultraviolet light cured rigid structural adhesive.

6. A coupler according to claim 2, wherein said rejacket material completely surrounds said length of said at least one jacketless lead portion.

7. A coupler according to claim 2, wherein said adhesive material is applied only between said length of said at least one jacketed lead portion and said length of said rejacketed lead portion and said protective body.

8. A method of packaging a fiber optic coupler having at least two optical fibers, including a coupled region and at least one lead portion extending therefrom, said optical fibers having a protective jacket thereon, said protective jacket being removed from said coupled region and from a region of said at least one lead portion adjacent said coupled region resulting in a coupled region, at least one jacketless lead portion, and at least one jacketed lead portion, said method comprising the steps of:
   providing a protective body having a receiving space therein for receiving said coupled region, said protective body having at least one entrance through which said at least one jacketed lead portion emerges when said coupled region is positioned therein;
   applying a rejacket material at least partially about a length of said at least one jacketless lead portion adjacent said at least one jacketed lead portion; and
   securing the fiber optic coupler within said receiving space of said protective body with an adhesive at least partially about a length of said at least one jacketed lead portion at said entrance and at least partially about said rejacket material.

9. A method according to claim 8, wherein said rejacket material is a soft buffer material.

10. A method according to claim 9, wherein said adhesive is a thermally cured rigid structural adhesive.

11. A method according to claim 9, wherein said adhesive is an ultraviolet light cured rigid structural adhesive.

12. A method according to claim 8, wherein said rejacket material is a soft acrylate.

13. A method according to claim 8, wherein said applying step includes applying said rejacket material completely about said length of said at least one jacketless lead portion.

14. A method according to claim 8, wherein said securing step includes applying said adhesive only between said length of said at least one jacketed lead portion and rejacketed lead portion and said protective body.

15. A fiber optic package containing a fiber optic device having at least one lead portion of an optical fiber extending therefrom, said optical fiber having a protective jacket thereon, said protective jacket removed from said at least one lead portion adjacent said fiber optic device resulting in a jacketless lead portion and a jacketed lead portion, said fiber optic package comprising:

protective body means for at least partially surrounding said fiber optic device, said protective body means having at least one entrance from which said optical fiber emerges;

rejacketing means for surrounding at least a portion of said jacketless lead portion adjacent to said jacketed lead portion, said rejacketing means being a soft material that adheres to glass; and, adhesive means at least partially surrounding said rejacketing means for rigidly securing said rejacketing means to said protective body means.

* * * * *